United States Patent
Lee

(10) Patent No.: US 7,817,147 B2
(45) Date of Patent: Oct. 19, 2010

(54) DISPLAY DEVICE HAVING PLURALITY OF POWER SUPPLIES AND METHOD FOR CONTROLLING THE SAME

(75) Inventor: Mog Sang Lee, Gumi-si (KR)

(73) Assignee: LG Electronics Inc., Seoul (KR)

( * ) Notice: Subject to any disclaimer, the term of this patent is extended or adjusted under 35 U.S.C. 154(b) by 977 days.

(21) Appl. No.: 11/386,703

(22) Filed: Mar. 23, 2006

(65) Prior Publication Data

US 2007/0109290 A1    May 17, 2007

(30) Foreign Application Priority Data

Nov. 15, 2005    (KR) .................. 10-2005-0109295

(51) Int. Cl.
*G09G 5/00*    (2006.01)
(52) U.S. Cl. .................. 345/211; 313/486; 235/383
(58) Field of Classification Search .............. 345/1.1, 345/1.3, 60–63, 211, 212; 313/486; 235/383
See application file for complete search history.

(56) References Cited

U.S. PATENT DOCUMENTS

| | | | | |
|---|---|---|---|---|
| 4,982,183 | A | | 1/1991 | Flegal et al. ............. 340/781 |
| 5,764,225 | A | | 6/1998 | Koshobu ................. 345/211 |
| 6,057,815 | A | * | 5/2000 | Sano ....................... 345/60 |
| 6,089,453 | A | * | 7/2000 | Kayser et al. ............ 235/383 |
| 6,424,325 | B1 | * | 7/2002 | Van Dijk .................. 345/60 |
| 7,471,047 | B2 | * | 12/2008 | Ogawa .................... 315/169.4 |
| 2002/0126069 | A1 | * | 9/2002 | Kim et al. ................. 345/60 |
| 2004/0119665 | A1 | * | 6/2004 | Kang et al. ............... 345/63 |
| 2004/0150636 | A1 | * | 8/2004 | Choi ........................ 345/211 |
| 2004/0246207 | A1 | * | 12/2004 | Yamada ................... 345/63 |
| 2005/0030260 | A1 | * | 2/2005 | Kim et al. ................. 345/60 |
| 2005/0046330 | A1 | * | 3/2005 | Okuyama et al. ......... 313/486 |
| 2006/0038806 | A1 | * | 2/2006 | Jeong ...................... 345/204 |

FOREIGN PATENT DOCUMENTS

CN    1452147    10/2003

(Continued)

OTHER PUBLICATIONS

European Search Report dated Dec. 29, 2008.

(Continued)

*Primary Examiner*—Amare Mengistu
*Assistant Examiner*—Premal Patel
(74) *Attorney, Agent, or Firm*—Ked & Associates LLP

(57) ABSTRACT

A display device having a plurality of power supplies and a method for controlling the same are provided. A large-screen display device can be embodied using a plurality of small-capacity power supplies. The operating states of the power supplies are monitored so that the user can immediately deal with abnormal operations of the power supplies. The display device includes a Plasma Display Panel (PDP) module including a plurality of boards that are grouped into at least two groups, at least two power supplies corresponding to the at least two groups and supplying power to the grouped boards, and a controller. Upon receiving a power-on command, the controller controls the at least two power supplies to be activated and controls them to supply power to the grouped boards in the PDP module.

18 Claims, 5 Drawing Sheets

FOREIGN PATENT DOCUMENTS

| | | |
|---|---|---|
| EP | 1 469 447 A2 | 10/2004 |
| JP | 11-220678 | 8/1999 |
| JP | 2004-045485(A) | 2/2004 |
| KR | 10-2001-0046343 A | 6/2001 |
| KR | 10-2002-0011239 | 2/2002 |
| KR | 10-2004-0011603 | 2/2004 |
| KR | 10-2004-0091840 | 11/2004 |
| WO | WO 00/65428 | 11/2000 |
| WO | WO 2005/101358 | 10/2005 |

OTHER PUBLICATIONS

Korean Office Action dated Aug. 30, 2006.
Chinese Patent Gazette dated Apr. 8, 2009.

* cited by examiner

DISPLAY DEVICE HAVING PLURALITY OF POWER SUPPLIES AND METHOD FOR CONTROLLING THE SAME

This application claims the benefit of the Korean Patent Application No. 10-2005-0109295, filed on Nov. 15, 2005, which is hereby incorporated by reference as if fully set forth herein.

BACKGROUND OF THE INVENTION

1. Field of the Invention

The present invention relates to a display device, and more particularly, to a display device having a plurality of power supplies and a method for controlling the same.

2. Discussion of the Related Art

There are a wide variety of display devices. The television is a typical display device.

The television tunes in to a broadcast signal received through a channel selected by a user, from among broadcast signals transmitted from a broadcast station, and demodulates and separates the tuned broadcast signal into audio and video data.

The television processes the audio and video data so that the audio and video data can be output respectively through a speaker and a screen of the television. The television then outputs the processed audio and video data respectively through the speaker and screen.

The variety of televisions include not only a Cathode Ray Tube (CRT) television, which is the most widely used one, but also televisions that use a Liquid Crystal Display (LCD), a Plasma Display Panel (PDP), and the like for satisfying demand for high image quality and large screen.

Due to its structural characteristics, the PDP television can be made to be much thinner than the general CRT television and also exhibits much higher luminance than the LCD television.

It is also easy to install the PDP television on the wall. Due to such good features, the PDP television is attracting lots of attention as a next generation TV.

However, a high voltage is required to drive PDP display devices due to the characteristics of PDP display devices. Thus, one of the most important technologies in popularizing PDP display devices is a technology for efficiently controlling components associated with the power supply.

A PDP display device generally includes upper and lower substrates that are laminated together. The upper substrate includes scan and sustain electrodes formed in parallel on a substrate and dielectric and protective layers formed over the substrate including the scan and sustain electrodes.

The lower substrate includes address electrodes formed on a substrate, a dielectric layer formed over the substrate including the address electrodes, partition walls formed between the address electrodes and between the dielectric layers, and fluorescent material formed on the surface of the dielectric layer and on the surfaces of partition walls in each discharge cell.

A space between the upper and lower substrates is filled with a discharge gas mixed with an inert gas such as He or Xe, so that the space therebetween forms a discharge area.

In such a PDP display device, specific voltages are applied to the electrodes to cause an electrical discharge in the discharge gas. This produces ultraviolet light, and the fluorescent material is excited by the ultraviolet light, thereby displaying colors.

The PDP display device includes a module driver to drive the PDP module so that the specific voltages are applied to the electrodes at preset times.

FIG. 1 is a block diagram of a conventional display device that has a power supply control apparatus.

With reference to FIG. 1, a description will now be given of how power is supplied in the conventional display device.

The following description will focus particularly on a PDP display device among the conventional display devices.

As shown in FIG. 1, the conventional display device 101 includes a standby power supply 102, a microcomputer 103, a PFC 104, a relay 105, a relay driver 106, a Vs power supply 107, a Va power supply 108, a $V_{setup}$ power supply 109, a Vsc power supply 110, and a PDP module 112. The standby power supply 102 supplies standby power to the components of the display device 101 to allow them to respond to an operating command input by a user using a remote controller or the like while the display device is in standby mode, i.e., while no image is displayed. The microcomputer 103 receives drive power from the standby power supply 102 and outputs a control signal according to a preset control algorithm. The PFC 104 receives input commercial AC power and corrects the power factor. The relay 105 controls power supply to the PFC 104. The relay driver 106 controls the operation of the relay 105 according to a control signal from the microcomputer 103. The Vs power supply 107 transforms an output voltage of the PFC 104 to supply Vs power to drive sustain electrodes. The Va power supply 108 transforms the output voltage of the PFC 104 to supply Va power to drive address electrodes. The $V_{setup}$ power supply 109 transforms the output voltage of the PFC 104 to supply a setup voltage. The Vsc power supply 110 transforms the output voltage of the PFC 104 to supply Vsc power to drive scan electrodes. The PDP module 112 is driven by the power supplied from the Vs power supply 107, the Va power supply 108, the $V_{setup}$ power supply 109, and the Vsc power supply 110.

A more detailed description will now be given of how the conventional display device 101 operates to control the power.

First, once the user inputs a command to power on the display device 101, the microcomputer 103 detects the command and drives the components of the display device 101 according to a preset control algorithm.

For example, the microcomputer 103 outputs a control signal to the relay driver 106 to drive it. As the relay 105 is driven, power is supplied to the PFC 104, whereby power is also supplied to the Vs power supply 107, the Va power supply 108, the $V_{setup}$ power supply 109, and the Vsc power supply 110.

Specifically, when the user presses down a button to power on the display device 101, a control signal is first output to the relay driver 106, and a control signal is then output to the Vs power supply 107, the Va power supply 108, the $V_{setup}$ power supply 109, and the Vsc power supply 110.

The Vs power supply 107, the Va power supply 108, the $V_{setup}$ power supply 109, and the Vsc power supply 110 supply their powers to corresponding electrodes, thereby driving the PDP module 112 so that images of a channel selected by the user are displayed on the screen of the display device 101.

However, the method for controlling the power of the conventional display device 101 (for example, a PDP display device) has the following problems.

First, increasing the screen size of the display device requires that higher power be supplied to the display device, and a new power board dedicated to large modules must be separately manufactured to supply higher power to the conventional display device.

Second, the conventional display device has no way to determine whether the power supply is operating normally or abnormally.

SUMMARY OF THE INVENTION

Accordingly, the present invention is directed to a display device having a plurality of power supplies and a method for controlling the same that substantially obviate one or more problems due to limitations and disadvantages of the related art.

An object of the present invention is to provide a display device having a plurality of power supplies and a method for controlling the same, whereby, even when the screen size of the display device is increased, stable power can be supplied without providing a separate power board dedicated to large modules.

Another object of the present invention is to provide a display device having a plurality of power supplies and a method for controlling the same that can easily determine whether or not the power supplies provided in the display device are operating normally.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device having a plurality of power supplies includes a Plasma Display Panel (PDP) module including a plurality of boards that are grouped into at least two groups; at least two power supplies corresponding to the at least two groups and supplying power to the grouped boards; and a controller that, upon receiving a power-on command, controls the at least two power supplies to be activated and controls the at least two power supplies to supply power to the grouped boards in the PDP module.

In another aspect of the present invention, a display device having a plurality of power supplies includes a Liquid Crystal Display (LCD) module including a plurality of boards that are grouped into at least two groups; at least two power supplies corresponding to the at least two groups and supplying power to the grouped boards; and a controller that, upon receiving a power-on command, controls the at least two power supplies to be activated and controls the at least two power supplies to supply power to the grouped boards in the LCD module.

In another aspect of the present invention, a method for controlling a display device having a plurality of power supplies includes receiving a command to power on the display device, grouping a plurality of boards in a PDP module into at least two groups, and allowing at least two power supplies, corresponding to the at least two groups, to supply power to the grouped boards.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
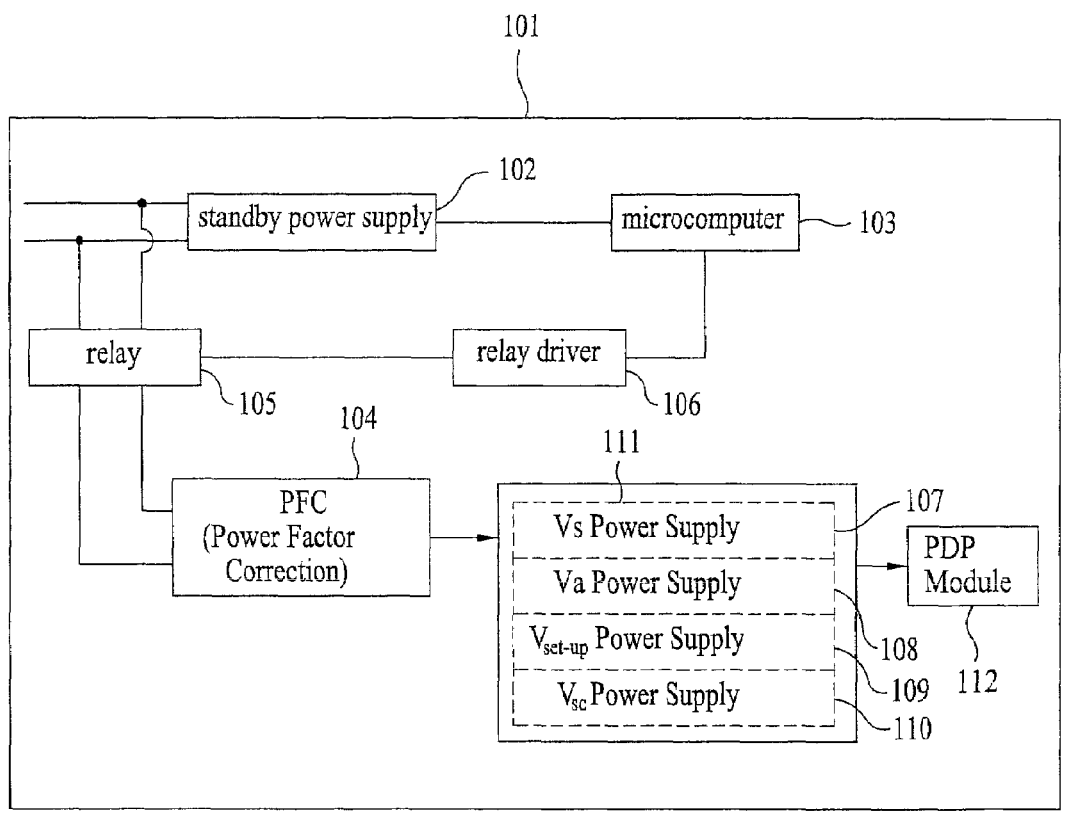
FIG. 1 is a block diagram of a conventional display device that has a power supply control apparatus.
Figure 2:
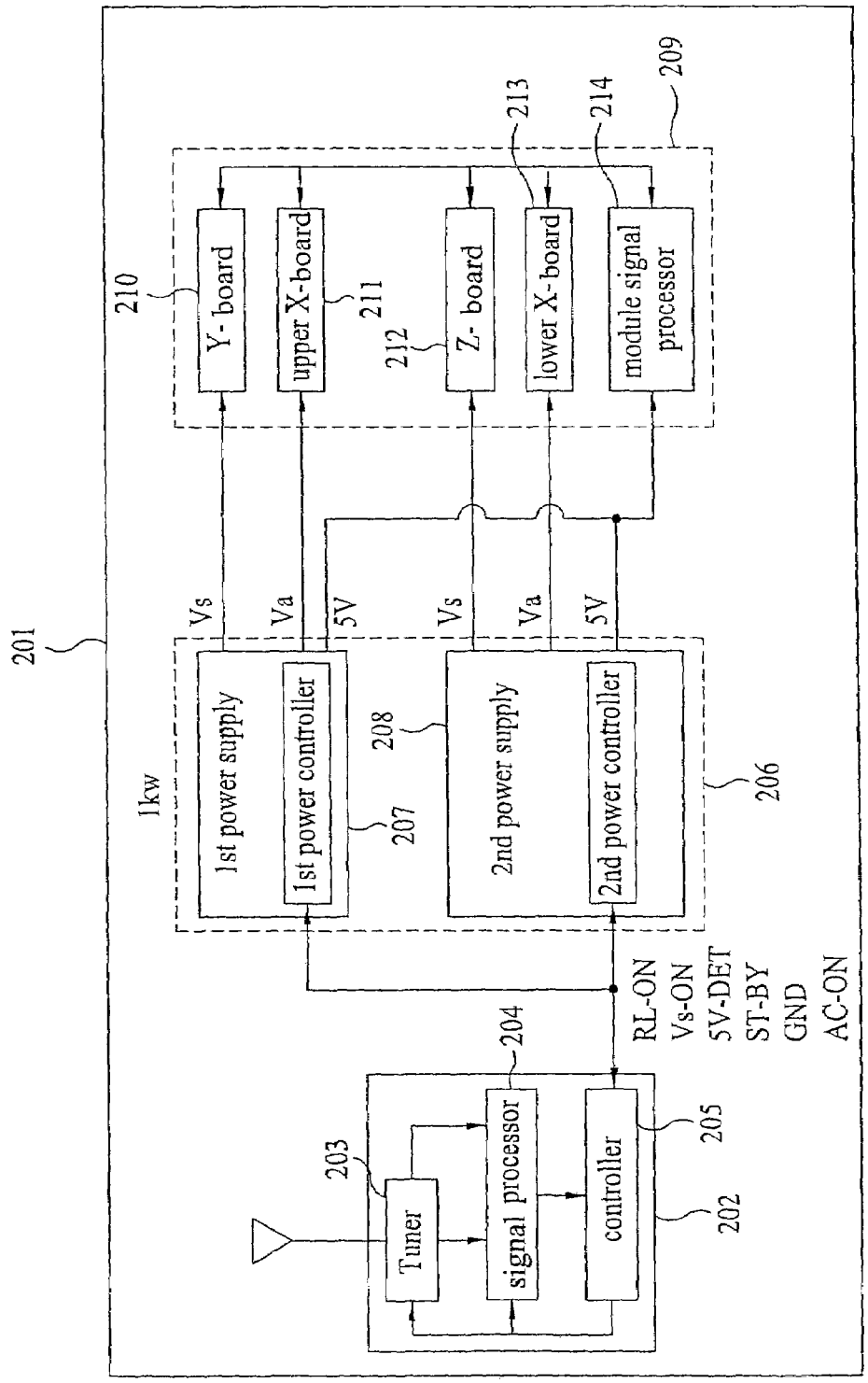
FIG. 2 is a block diagram of a first embodiment of a display device having a plurality of power supplies according to the present invention.

FIG. 2 is a block diagram of a first embodiment of a display device having a plurality of power supplies according to the present invention.

With reference to FIG. 2, a description will now be given of how two power supplies provided in a display device according to the present invention operate to supply power to a PDP module.

The display device 201 according to the present invention includes a signal board 202, a power supply unit 206, and a PDP module 209.

For example, the display device 201 may be a PDP display device such as a PDP television or a PDP monitor. The following description will be given under the assumption that the display device 201 is a PDP display device.

However, the display device 201 may also be an LCD device such as an LCD television or an LCD monitor. In this case, the PDP module 209 illustrated in FIG. 2 will be replaced with an LCD module.

The following description about the PDP display device can be directly applied to the LCD display device and the LCD display device can be easily understood from the description of the PDP display device by those skilled in the art, and thus a separate description of the LCD display device will be omitted.

The scope of the present invention is not limited to the PDP display device and can be extended to the LCD display device.

The signal board 202 includes a tuner 203, a signal processor 204, and a controller 205. The tuner 203 tunes in to a broadcast signal received through an antenna.

The signal processor 204 processes a broadcast signal received through the tuner 203.

The controller 205 controls the operation of the tuner 203 and the signal processor 204. The controller 205 also controls the operation of the power supply unit 206 to supply power according to a request command of a user.

The power supply unit 206 includes a first power supply 207 and a second power supply 208. While the conventional display device includes one power supply unit 111, the power supply unit 206 of the PDP display device according to the present invention includes two power supplies. Of course, the scope of the present invention is not limited to two power supplies. The range of a required amount of power varies as the size of the PDP display device increases, and thus the number of power supplies can be adjusted based on the range of the required amount of power.

Figure 3:
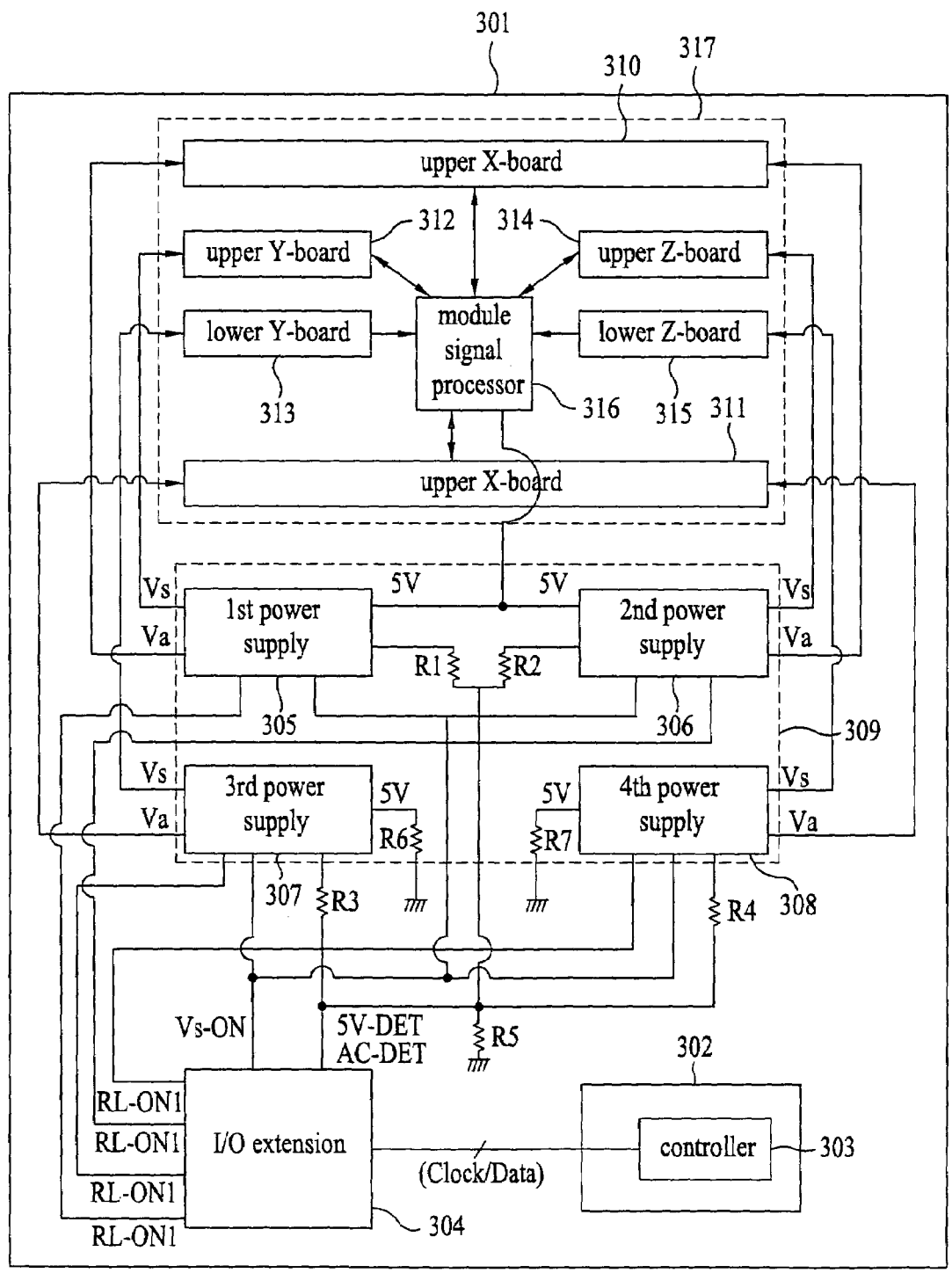
FIG. 3 is a block diagram of a second embodiment of a display device having a plurality of power supplies according to the present invention.

For example, when each of the first and second power supplies 207 and 208 shown in FIG. 2 is a power supply dedicated to PDP display devices of 42 or 50 inches, it is possible to effectively power a PDP display device of about 71 inches by connecting the first and second power supplies 207 and 208 in parallel as shown in FIG. 2.

is also possible to effectively power a PDP display device of about 100 inches by connecting four power supplies dedicated to PDP display devices of 42 or 50 inches as shown in FIG. 3. In this manner, a PDP display device of 100 or more inches can be embodied using the conventional small-capacity power supplies.

The PDP module 209 includes upper and lower X-boards 211 and 213, a Y-board 210, a Z-board 212, and a module signal processor 214.

The X-boards 211 and 213 function to address video data, the Y-board 210 functions to scan video data, the Z-board 212 functions to control a discharge voltage, and the module signal processor 214 receives power from the power supplies 207 and 208 and functions to output signals processed by the X-boards 211 and 213, the Y-board 210, and the Z-board 212.

The first power supply 207 supplies a Va voltage (or power) to the upper X-board 211 and a Vs voltage (or power) to the Y-board 210 according to a control signal from the controller 205.

The second power supply 208 supplies a Va voltage (or power) to the lower X-board 213 and a Vs voltage (or power) to the Z-board 212 according to a control signal from the controller 205.

The first and second power supplies 207 and 208 may also be designed such that their functions are reversed, i.e., such that the first power supply 207 supplies power to the lower X-board 213 and the Z-board 212 and the second power supply 208 supplies power to the upper X-board 211 and the Y-board 210.

In the present invention, the upper X-board 211 and the Y-board 210 are grouped together and the lower X-board 213 and the Z-board 212 are grouped together taking into consideration the fact that power consumption of both the upper X-board 211 and the Y-board 210 approximates power consumption of both the lower X-board 213 and the Z-board 212 within an error range.

Of course, when the first and second power supplies 207 and 208 are set to supply different amounts of power from those described above, the boards can be designed to be grouped differently from those described above.

The first and second power supplies 207 and 208 are connected in parallel and are designed so that both can be turned on or off simultaneously. The first and second power supplies 207 and 208 supply constant voltage power to the boards of the PDP module 209 which are grouped based on predetermined criteria.

One example of the grouping based on the predetermined criteria is to group the boards into groups such that power consumption of each group approximates each other within an error range as described above.

For example, the error range may be set to a range of 0 to 30% such that power consumption of each group of boards approximates each other within the error range of 0 to 30%.

According to one embodiment of the present invention, in some situations, the plurality of boards are grouped based on the maximum power supplied by the power supplies 207 and 208.

A more detailed description will now be given of how the two power supplies 207 and 208 provided in the display device according to the present invention operate to supply power to the PDP module 209.

When the user of the display device 201 inputs a power-on command, the controller 205 receives the command and transfers a control signal corresponding to the command to the power supplies 207 and 208.

The first power supply 207, one element of the power supply unit 206, supplies power to the upper X-board 211 and the Y-board 210 grouped together in the PDP module 209 and the second power supply 208, another element of the power supply unit 206, supplies power to the lower X-board 213 and the Z-board 212 grouped together in the PDP module 209.

The first and second power supplies 207 and 208 supply 5V power to the module signal processor 214, and the module signal processor 214 outputs signals processed by the X-boards 211 and 213, the Y-board 210, and the Z-board 212.

FIG. 3 is a block diagram of a second embodiment of a display device having a plurality of power supplies according to the present invention.

With reference to FIG. 3, a description will now be given of how four power supplies provided in a display device according to the present invention operate to supply power to a PDP module.

The embodiment of FIG. 3 differs from the embodiment of FIG. 2 in that the number of power supplies provided in the display device is increased to 4 and an I/O extension unit is added to the display device.

Two power supplies dedicated to PDP display devices having a screen size of about 42 or 50 inches are enough for the PDP display device having a screen size of about 71 inches as shown in FIG. 2. However, about four power supplies dedicated to PDP display devices having a screen size of about 42 or 50 inches are required for the PDP display device having a screen size of 100 or more inches. Taking into consideration this fact, the display device of the second embodiment is designed with four power supplies as shown in FIG. 3. In some cases, the PDP display device may be designed with a different number of power supplies, taking into consideration both power required for the PDP module and power supplied by each power supply.

A display device 301 according to the second embodiment includes a PDP module 317, a power supply unit 309, an Input/Output (I/O) extension 304, and a signal board 302.

PDP module 316 includes an upper X-board 310, a lower X-board 311, an upper Y-board 312, a lower Y-board 313, an upper Z-board 314, a lower Z-board 315, and a module signal processor 316.

The power supply unit 309 includes a first power supply 305, a second power supply 306, a third power supply 307, and a fourth power supply 308.

The signal board 302 includes a tuner (not shown), a signal processor (not shown), and a controller 303.

The power supply unit 309 supplies power to the components of the PDP module 317, which are the X-boards 310 and 311, the Y-boards 312 and 313, the Z-boards 314 and 315, and the module signal processor 316.

The I/O extension unit 304 drives the power supply unit 309, and the operating state of the power supply 309 is fed back to the I/O extension unit 304.

The controller 303 controls power supply to the PDP module 317 or monitors the operating state of the power supply unit 309 according to a request command of a user of the display device 301.

The first power supply 305, the second power supply 306, the third power supply 307, and the fourth power supply 308 are sequentially driven according to a drive signal from the I/O extension unit 304. The reason why the first to fourth power supplies 305 to 308 are not driven simultaneously is to prevent the display device 301 from being overloaded, which would otherwise damage the display device 301.

The first power supply 305 is driven by a first power-on signal RL-ON1 received from the I/O extension unit 304 to supply a Va voltage (or power) to the upper X-board 310 and to supply a Vs voltage (or power) to the upper Y-board 312.

The second power supply 306 is driven by a second power-on signal RL-ON2 received from the I/O extension unit 304 to supply a Vs voltage (or power) to the upper Z-board 314 and to supply a Va voltage (or power) to the upper X-board 310.

The third power supply 307 is driven by a third power-on signal RL-ON3 received from the I/O extension unit 304 to supply a Va voltage (or power) to the lower X-board 311 and to supply a Vs voltage (or power) to the lower Y-board 313.

The fourth power supply 308 is driven by a fourth power-on signal RL-ON4 received from the I/O extension unit 304 to supply a Va voltage (or power) to the lower X-board 311 and to supply a Vs voltage (or power) to the lower Z-board 315.

The four power supplies 305 to 308 supply constant voltage power to the boards in the PDP modules 317 which are grouped based on predetermined criteria. As described above, one example of the grouping method based on the predetermined criteria is to calculate power consumption of each of the boards and then to group the boards into groups such that power consumption of each group of boards approximates each other within an error range as described above.

The power supply unit 309 further includes a first resistor R1 connected at one end to the first power supply 305, a second resistor R2 connected at one end to the first resistor R1 and at the other end to the second power supply 306, a third resistor R3 connected at one end to the third power supply 307, a fourth resistor R4 connected at one end to the third resistor R3 and at the other end to the fourth power supply 308, a fifth resistor R5 connected at one end to the first to fourth resistors R1 to R4 and grounded at the other end, a sixth resistor R6 connected at one end to an output of the third power supply 307 and grounded at the other end, and a seventh resistor R7 connected at one end to an output of the fourth power supply 308 and grounded at the other end.

The first to fifth resistors R1 to R5 are additionally provided to the display device 301 in order to determine whether or not the first to fourth power supplies 305 to 308 are operating normally according to the first to fourth signals RL-ON1 to RL-ON4 sequentially received from the I/O extension unit 304.

Based on an input divided voltage, obtained by voltage division through the resistors, the I/O extension unit 304 and the controller 303 determine whether or not the first to fourth power supplies 305 to 308 have been activated normally.

When all the first to fourth power supplies 305 to 308 have been activated normally, the I/O extension unit 304 outputs a high signal through a preset terminal Vs-ON. This allows the first to fourth supplies 305 to 308 to output the Va and Vs voltages to the grouped boards in the PDP module 317, so that a video image is displayed on the screen of the display device 301.

A more detailed description will now be given of how the four power supplies provided in the display device 301 according to the present invention operate to supply power to the PDP module 317.

Once the controller 303 outputs a command to power on the display device according to a request of the user, the I/O extension unit 304 outputs a high signal through the first power-on line RL-ON1. This activates the first power supply 305 to output required power to the signal board 302 and to output 5V power to the module signal processor 316.

As the first power supply 305 is activated, the voltage 5V for activation of the module signal processor 316 is divided through the first and fifth resistors R1 and R5, so that a divided voltage of about 2V is input to a detection terminal of the I/O extension unit 304.

Through communication with the I/O extension unit 304, the controller 303 determines whether or not the first power supply 305 has been activated normally. The communication between the I/O extension unit 304 and the controller 303 may be I2C communication.

Once the I/O extension unit 304 outputs a high signal through the second power-on line RL-ON2 in order to activate the second power supply 306, the second power supply 306 is activated to output required power to the signal board 302 and to output 5V power to the module signal processor 316 in the PDP module 317 in the same manner as the first power supply 305.

Accordingly, a divided voltage of about 3V, obtained by the voltage division through the second resistor R2 and the first and fifth resistors R1 and R5, is input to the detection terminal of the I/O extension unit 304. Then, through communication with the I/O extension unit 304, the controller 303 determines that the second power supply 306 has been activated normally.

The third and fourth power supplies 307 and 308 are sequentially activated in the above manner. When the first to fourth power supplies 305 to 308 have all been activated, a preset voltage is input to the I/O extension unit 304 through the preset detection terminal.

When at least one of the first to fourth power supplies 305 to 308 has been activated abnormally, the voltage input to the detection terminal of the I/O extension unit 304 drops below the preset voltage, which allows the controller 303 to determine which one of the first to fourth power supplies 305 to 308 has malfunctioned.

Figure 4:
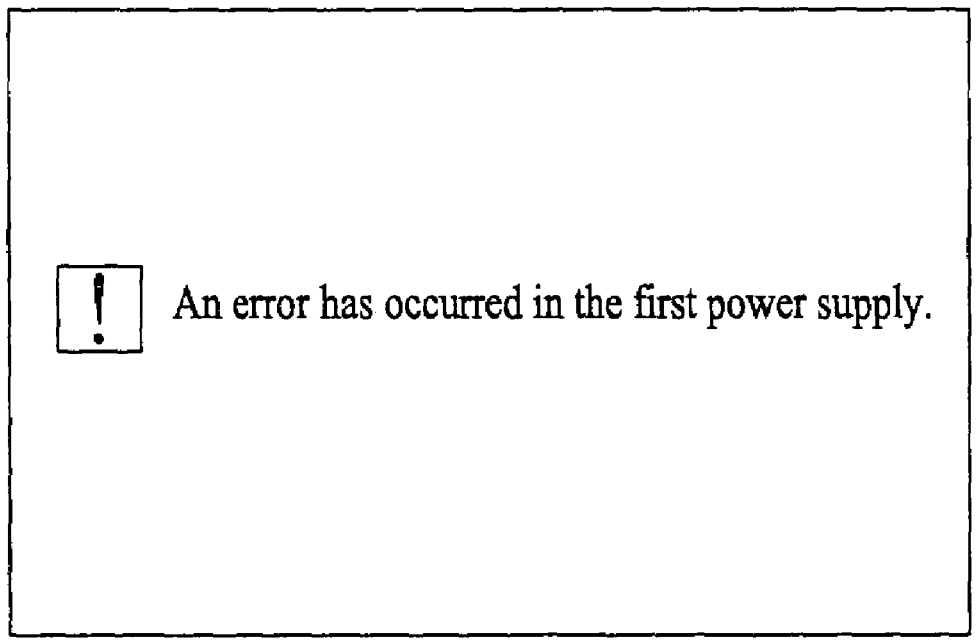
FIG. 4 illustrates an example screenshot of the display device having a plurality of power supplies according to the present invention.

FIG. 4 illustrates an example screenshot of the display device having a plurality of power supplies according to the present invention.

With reference to FIG. 4, a description will now be given of how the display device 301 according to the present invention notifies the user whether or not the power supply unit 309 in the display device 301 has malfunctioned.

When at least one of the first to fourth power supplies 305 to 308 is operating abnormally, the controller 303 displays information of the power supply in abnormal operation on the screen of the display device 301 as shown in FIG. 4.

When all the power supplies 305 to 308 are malfunctioning, the display device 301 may not display even the information of the power supplies in abnormal operation. Thus, the controller 303 is designed to output the information of the malfunctioning power supplies through a speaker (not shown) of the display device 301.

Of course, the controller 303 may also be designed to display the information of the malfunctioning power supplies on the screen and also to output the information through the speaker.

The controller 303 is designed to detect voltage changes at regular intervals to automatically cut off power supply when an abrupt voltage change has occurred due to power failure or the like.

Upon the completion of the check as to whether or not the first to fourth power supplies 305 to 308 are operating normally, the I/O extension unit 304 outputs a high signal through the terminal Vs-ON, thereby allowing the first to fourth power supplies 305 to 308 to output the Vs and Va voltages to the grouped boards in the PDP module 317.

Upon receiving the high signal from the I/O extension unit 304 through the terminal Vs-ON, the first power supply 305 supplies the Va voltage to the upper X-board 310 and supplies the Vs voltage to the upper Y-board 312.

Upon receiving the high signal from the I/O extension unit 304 through the terminal Vs-ON, the second power supply 306 supplies the Va voltage to the upper X-board 310 and supplies the Vs voltage to the upper Z-board 314.

Upon receiving the high signal from the I/O extension unit 304 through the terminal Vs-ON, the third power supply 307 supplies the Va voltage to the lower X-board 311 and supplies the Vs voltage to the lower Y-board 313.

Upon receiving the high signal from the I/O extension unit 304 through the terminal Vs-ON, the fourth power supply 308 supplies the Va voltage to the lower X-board 311 and supplies the Vs voltage to the lower Z-board 315.

Using the small-capacity power supplies 305 to 308, the Va and Vs voltages are supplied to the boards in the PDP modules 317 which are grouped based on predetermined criteria, so that a video image is output normally.

The present invention also ensures more stable power supply since the first to fourth power supplies 305 to 308 are sequentially activated so that inrush currents sequentially flow.

Figure 5:
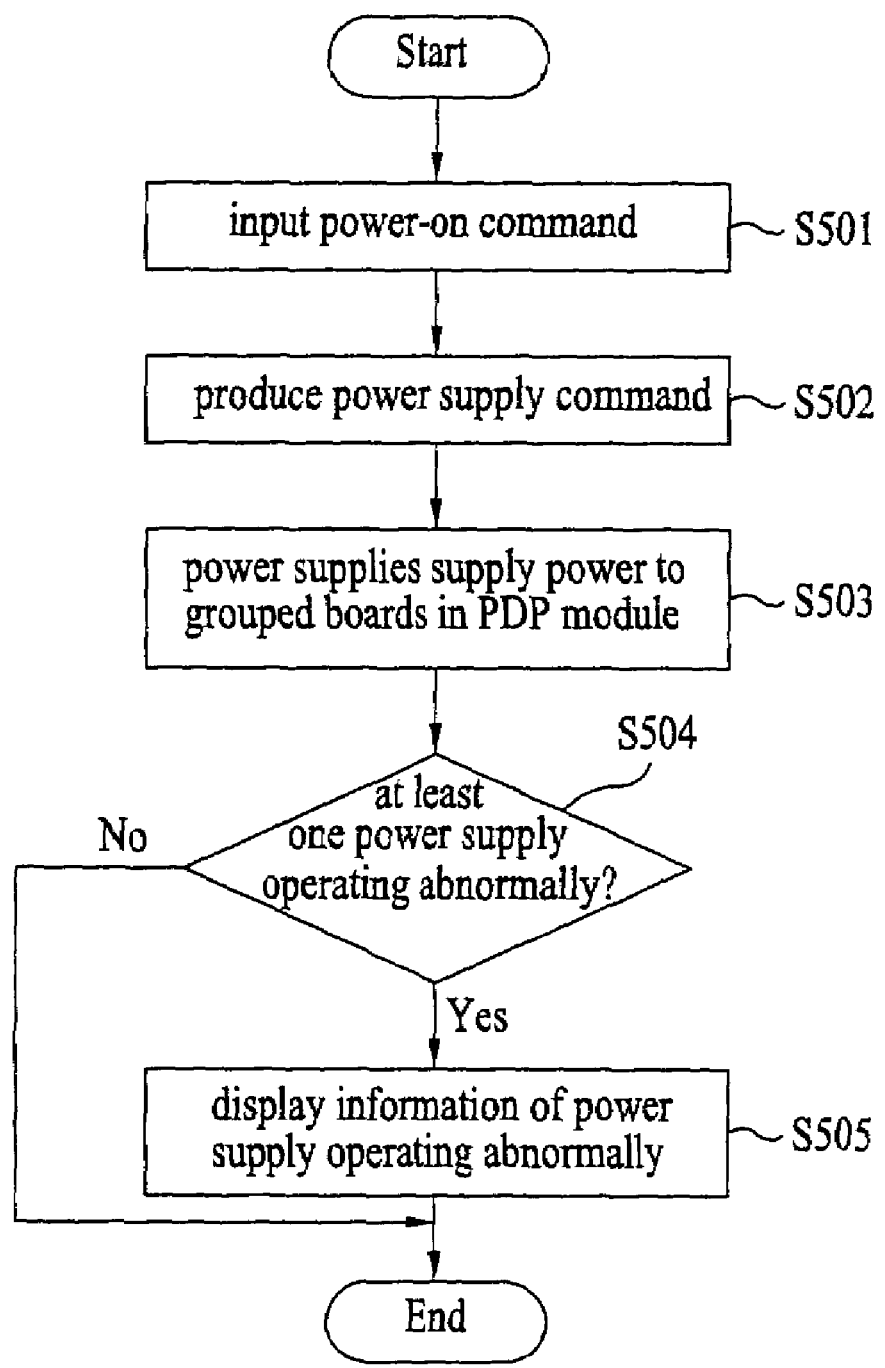
FIG. 5 is a flow chart of an example method for controlling a display device having a plurality of power supplies according to the present invention.

FIG. 5 is a flow chart of an example method for controlling a display device having a plurality of power supplies according to the present invention.

With reference to FIG. 5, a description will now be given of how the display device having a plurality of power supplies according to the present invention controls power supply.

The control method shown in FIG. 5 is a method for controlling the display device shown in FIG. 2 or 3, which has been described in detail above, and thus a detailed description of the control method shown in FIG. 5 is omitted herein.

First, a command to power on the display device 201 or 301 is input (S501). For example, the user may input the command using a Local Key button or a remote controller of the video unit 101.

The display device 201 or 301 may be a PDP television, a PDP monitor, or the like.

After the command to power on the display device 201 or 301 is input (S501), a power supply command is produced for the plurality of power supplies 207 and 208 or 305 to 308 in the display device 201 or 301 (S502).

The power supplies 207 and 208 or 305 to 308 supply specific voltages to the boards grouped in the PDP module 209 or 317 (S503). A variety of methods for grouping the boards may be employed. For example, the boards can be grouped into groups such that power consumption of each group of boards approximates each other within an error range.

Of course, if powers supplied by the power supplies 207 and 208 or 305 to 308 are not equal, the boards in the PDP module 209 or 317 can be grouped in a different manner.

While the power supplies 305 to 308 supply the power (S503), the I/O extension unit 304 and the controller 303 detect a power supply operating abnormally from among the power supplies 305 to 308 (S504). A detailed description of the detection method of the I/O extension unit 304 and the controller 303 is omitted since it has already been described with reference to FIG. 3.

When a power supply operating abnormally is detected, information of the detected power supply is displayed on the screen of the display device 301 or is output through the speaker or the like (S505).

The terms used in the present invention are terms defined taking into consideration the functions obtained in accordance with the present invention. The definitions of these terms should be determined based on the whole content of this specification because they may be changed in accordance with the option of a user or a usual practice.

As is apparent from the above description, the present invention provides a display device having a plurality of power supplies and a method for controlling the same, which have the following advantages.

First, although there is a need to develop a large PDP module as the size of the PDP display device increases, a large PDP display device can be embodied using power supplies, which have been used for conventional small models, without providing a new power supply dedicated to large PDP modules.

Second, conventional small-capacity power supplies can be reused, thereby reducing development costs.

Third, when a display device including four or more power supplies connected thereto is initially powered on, the power supplies are sequentially activated, thereby reducing the startup current.

Fourth, the startup current reduction reduces influence of the display device according to the present invention upon other electric devices located near the display device.

Fifth, the operating states of the power supplies are monitored so that the user can immediately and easily deal with an error occurring in the power supplies.

Sixth, even when the size of the PDP display device is increased, its energy efficiency can be increased using a plurality of low power supplies.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device having a plurality of power supplies, the display device comprising:
   a Plasma Display Panel (PDP) module including a plurality of boards that are grouped into at least two groups;
   at least two power supplies corresponding to respective ones of the at least two groups and supplying power to respective ones of the grouped boards at a same time; and
   a controller that, upon receiving a power-on command, controls the at least two power supplies to be activated and controls the at least two power supplies to supply power to the grouped boards in the PDP module, wherein the plurality of boards in the PDP module are grouped so that power consumption of one group of boards approximates power consumption of another group of boards to within a predetermined error range.

2. The display device according to claim 1, wherein the at least two groups of boards in the PDP module correspond respectively to the at least two power supplies.

3. The display device according to claim 1, wherein the plurality of boards includes an X-board, a Y-board, and a Z-board.

4. The display device according to claim 1, wherein a power supply dedicated to display devices having a screen size of 50 or less inches is used for each of the power supplies.

5. The display device according to claim 1, wherein the power supplies are activated sequentially or simultaneously according to a control signal from the controller.

6. The display device according to claim 1, further comprising:
   a detector that checks for changes in voltages applied to the at least two power supplies to determine whether or not the power supplies are operating normally.

7. The display device according to claim 6, wherein the detector includes resistors connected to the at least two power supplies.

8. The display device according to claim 6, wherein the controller checks for changes in voltages applied to the detector to determine whether or not the power supplies are operating normally.

9. The display device according to claim 8, wherein when at least one of the power supplies is operating abnormally, the controller allows information of the power supply operating abnormally to be output through a screen or speaker of the display device.

10. The display device according to claim 1, wherein the display device includes a PDP display device.

11. A display device having a plurality of power supplies, the display device comprising:
    a Liquid Crystal Display (LCD) module including a plurality of boards that are grouped into at least two groups;
    at least two power supplies corresponding to respective ones of the at least two groups and supplying power to respective ones of the grouped boards; and
    a controller that, upon receiving a power-on command, controls the at least two power supplies to be activated and controls the at least two power supplies to supply power to the grouped boards in the LCD module, wherein the plurality of boards in the LCD module are grouped so that power consumption of one group of boards approximates power consumption of another group of boards to within a predetermined error range.

12. A method for controlling a display device having a plurality of power supplies, the display device including a PDP module including a plurality of boards that are grouped into at least two groups, at least two power supplies that supply power to the PDP module, and a controller that controls the power supplies to supply power to the PDP module, the method comprising:
    receiving a power-on command to power on the display device;
    providing a power supply command to control the power supplies to be activated sequentially or simultaneously according to the power-on command; and
    supplying power to the grouped boards in the PDP module according to the power supply command, wherein the plurality of boards in the LCD module are grouped so that power consumption of one group of boards approximates power consumption of another group of boards to within a predetermined error range.

13. The method according to claim 12, wherein the plurality of boards includes an X-board, a Y-board, and a Z-board, and wherein a first voltage power is supplied to the X-board and a second voltage power is supplied to the Y-board and Z-board.

14. The method according to claim 12, wherein power supplies dedicated to display devices having a screen size of 50 or less inches are used for the at least two power supplies.

15. The method according to claim 12, further comprising: determining whether or not the power supplies are operating normally.

16. The method according to claim 15 wherein determining whether or not the power supplies are operating normally includes: checking for changes in voltages applied to a detector connected to each of the power supplies; and determining, based on the checked voltage changes, whether or not the power supplies are operating normally.

17. The method according to claim 16, wherein determining, based on the checked voltage changes, whether or not the power supplies are operating normally includes determining that a specific one of the power supplies is operating abnormally when a voltage applied to the detector connected to the specific power supply is different from a preset voltage applied during normal operation.

18. The method according to claim 15, further comprising: outputting, when the determination is that at least one of the power supplies is operating abnormally, information of the power supply operating abnormally through a screen or speaker of the display device.

* * * * *